US011907989B2

(12) United States Patent
Morgan et al.

(10) Patent No.: US 11,907,989 B2
(45) Date of Patent: Feb. 20, 2024

(54) RECIPE-BASED SHOPPING LIST SERVICE METHOD AND SYSTEM

(71) Applicant: NCR Voyix Corporation, Atlanta, GA (US)

(72) Inventors: Kip Oliver Morgan, Atlanta, GA (US); Gina Torcivia Bennett, Lawrenceville, GA (US); Kelli Lee, Atlanta, GA (US); James Naoki Shaw, Marietta, GA (US)

(73) Assignee: NCR Voyix Corporation, Atlanta, GA (US)

( * ) Notice: Subject to any disclaimer, the term of this patent is extended or adjusted under 35 U.S.C. 154(b) by 0 days.

(21) Appl. No.: 17/512,906

(22) Filed: Oct. 28, 2021

(65) Prior Publication Data
US 2023/0137742 A1  May 4, 2023

(51) Int. Cl.
*G06Q 30/00* (2023.01)
*G06Q 30/0601* (2023.01)
*G06N 20/00* (2019.01)
*G06Q 10/0835* (2023.01)

(52) U.S. Cl.
CPC ......... *G06Q 30/0625* (2013.01); *G06N 20/00* (2019.01); *G06Q 30/0635* (2013.01); *G06Q 30/0639* (2013.01); *G06Q 10/0835* (2013.01); *G06Q 30/0603* (2013.01)

(58) Field of Classification Search
CPC .......... G06Q 30/0625; G06Q 30/0639; G06Q 30/0635; G06Q 30/0603; G06Q 10/0835
USPC ...................................................... 705/26.62
See application file for complete search history.

(56) References Cited

U.S. PATENT DOCUMENTS

| 9,965,798 | B1* | 5/2018 | Vaananen | F25D 27/005 |
| 2010/0121807 | A1* | 5/2010 | Perrier | G06Q 30/02 |
| | | | | 706/47 |
| 2017/0262931 | A1* | 9/2017 | Wood | G06Q 30/0635 |
| 2017/0316488 | A1* | 11/2017 | Kremen | G09B 5/06 |
| 2019/0130786 | A1* | 5/2019 | Kumbakonam | G09B 5/02 |
| 2020/0118461 | A1* | 4/2020 | Choi | G11B 27/22 |
| 2020/0302510 | A1* | 9/2020 | Chachek | G06V 20/52 |

(Continued)

OTHER PUBLICATIONS

Marshall, J. (2017). Foodpollo: Driving reliable food recommendations from a massive online food portal (Order No. 29096525). Available from ProQuest Dissertations & Theses Global. (2640977266). (Year: 2017).*

(Continued)

*Primary Examiner* — Arielle E Weiner
(74) *Attorney, Agent, or Firm* — Schwegman Lundberg & Woessner, P.A.

(57) ABSTRACT

An interface is rendered on a user-operated device. Selections are made with respect to a first set of options by the user operating the interface. A list of potential food dishes for further selection by the user is presented within the interface based on the selections. A food dish selection is received from the user through the interface. A recipe for the selected food dish is generated and presented within the interface based on the food dish selection and a list of ingredients needed for the recipe are generated as a shopping list for the user to obtain at a store. In an embodiment, a navigation route to obtain the ingredients within the store is provided to the user when the user is at the store, allowing the user to traverse the route within the store and obtain each of the ingredients.

11 Claims, 3 Drawing Sheets

(56) References Cited

U.S. PATENT DOCUMENTS

2021/0104322 A1* 4/2021 Narayan ............... G16H 10/40
2022/0036432 A1* 2/2022 Beltran .............. G06Q 30/0205
2022/0292568 A1* 9/2022 Faurot, III ......... G06Q 30/0641

OTHER PUBLICATIONS

Ref U Continued: Retrieved from https://www.proquest.com/dissertations-theses/foodpollo-driving-reliable-food-recommendations/docview/2640977266/se-2 (Year: 2017).*

Silva, X. d. S. (2020). Recommender systems for grocery retail—A machine learning approach (Order No. 28992768). Available from ProQuest Dissertations & Theses Global. (2637672987). (Year: 2020).*

Ref U Continued: Retrieved from https://www.proquest.com/dissertations-theses/recommender-systems-grocery-retail-machine/docview/2637672987/se-2 (Year: 2020).*

* cited by examiner

US 11,907,989 B2

RECIPE-BASED SHOPPING LIST SERVICE METHOD AND SYSTEM

BACKGROUND

As consumers become busier and busier with everyday obligations both professionally and personally, they have tended to eat out more often than they have historically ate at home. Studies have shown that families that eat meals together are likely to stay together longer and express a greater degree of personal happiness than those that do not eat together.

Unsurprisingly, many third-party food service providers have established robust business models where prepared or even non-prepared meals are sent to the consumers' homes to be heated up or prepared by the consumers within their homes. These business models thrived during the COVID19 pandemic when hard restrictions prevented consumers from eating out. Third-party delivery services also thrived during the pandemic as consumers continued to consume prepared meals from food service providers—the only difference is that now fast food can be delivered to the consumer's doorstep rather than picked up at a restaurant for consumption at home or eaten at the restaurant.

These third-party providers are limited in what is available to the consumer and come with hefty convenience and service charges that put many of these out of reach for some consumers.

Consumers often express a willingness to try new types of food dishes but are frustrated by the lack of perceived available choices, difficulty associated with shopping for the food items needed, lack of skill believed to be needed to prepare the dishes, and the expense believed to be needed to eat something new or eat healthy. Furthermore, many consumers believe they are restricted in what they can try because of their dietary restrictions (e.g., vegan, low sodium, allergies, gluten free, vegetarian, religious restrictions, etc.).

SUMMARY

In various embodiments, methods and a system for providing a recipe-based shopping list service are presented.

According to an aspect, a method for providing a recipe-based shopping list service, is presented. A set of values or selections for a food dish is received from a user operating a device. Candidate food dishes are obtained using the set or values or selections. The candidate food dishes are provided to the device for a user selection and the user selection is obtained for a particular one of the candidate food dishes. A first list is obtained for ingredients in a recipe associated with the user selection and a store product catalogue is searched for the ingredients. A second list is generated for obtaining the ingredients from a store and the second list, a store identifier for the store, and the recipe are provided to the device for access by the user.

DETAILED DESCRIPTION

Figure 1:
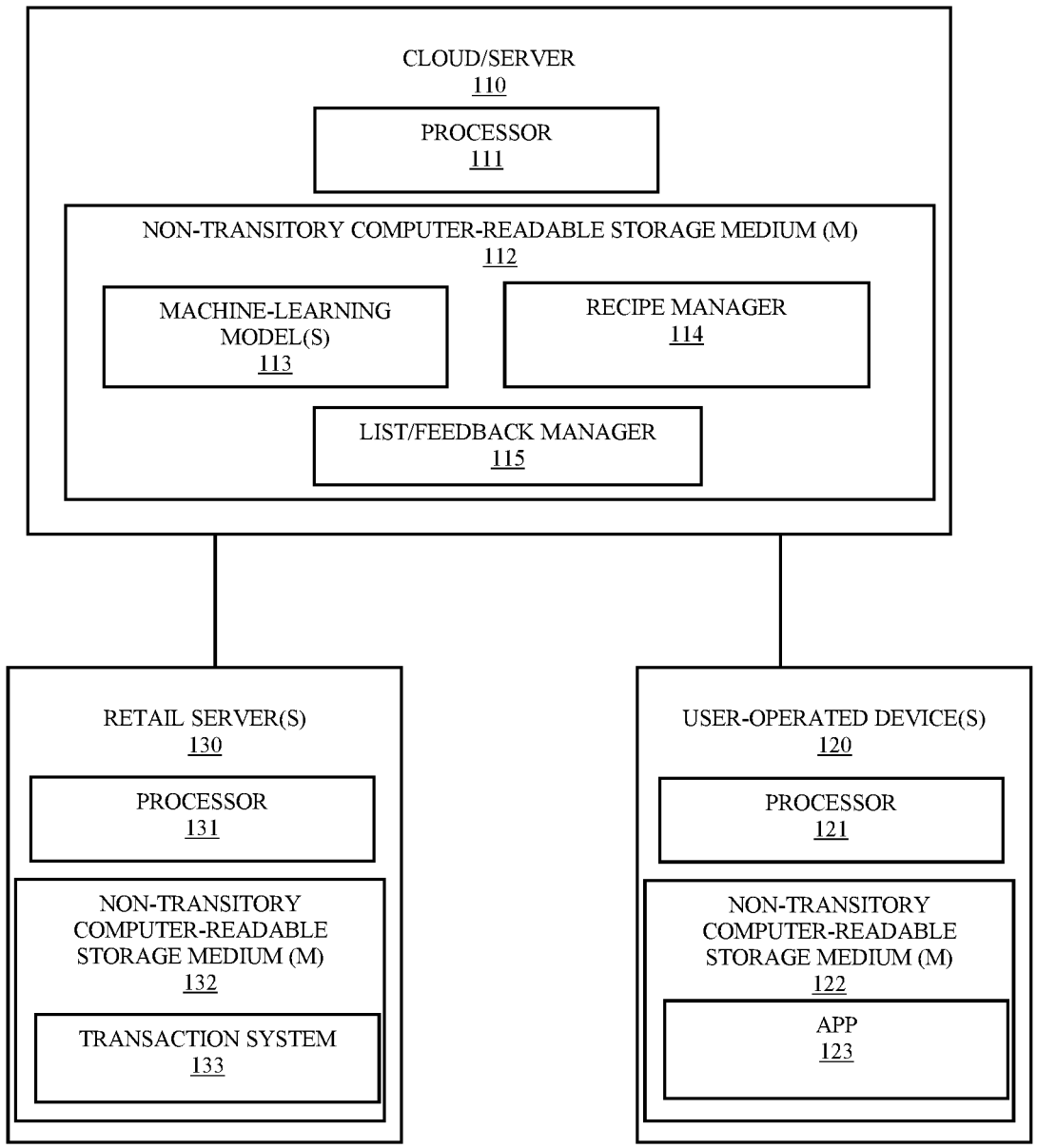
FIG. 1 is a diagram of a system for providing a recipe-based shopping list service, according to an example embodiment.

FIG. 1 is a diagram of a system 100 providing a recipe-based shopping list service, according to an example embodiment. It is to be noted that the components are shown schematically in greatly simplified form, with only those components relevant to understanding of the embodiments being illustrated.

Furthermore, the various components (that are identified in FIG. 1) are illustrated and the arrangement of the components is presented for purposes of illustration only. It is to be noted that other arrangements with more or less components are possible without departing from the teachings of providing a recipe-based shopping list service as presented herein and below.

As will be discussed in the various embodiments that follow, the teachings provide techniques by which a user can use a recipe-based service via a mobile application (app) and a customer facing interface of the app to provide some basic and initial suggestions for the current cravings of the customer. The selections are used to identify dishes and recipes associated with preparing each dish. The customer selects a dish and a shopping list comprising the ingredients is automatically generated and provided to the user via the app. When the customer arrives at a store for the shopping list of ingredient items, the app provides a navigation interface and a path for the customer to optimally traverse the store and pick the ingredient items. In an embodiment, feedback after a dish is prepared by the customer along with a customer rating for the dish, this information is processed through a machine-learning model to better select dishes and rank dishes when customers make their initial selections for their cravings within the app.

System 100 comprises a cloud/server 110, a plurality of customer-operated devices 120 and one or more retail servers 130.

Cloud/Server 110 comprises at least one processor 111 and a non-transitory computer-readable storage medium 112. Medium 112 comprises executable instructions for one or more machine-learning models (algorithms) 113, a recipe manager 114, and a list/feedback manager 115. The executable instructions when executed by processor 111 from the medium 112 cause processor 111 to perform operations discussed herein and below with model(s) 113, recipe manager 114, and list/feedback manager 115.

Each customer-operated device 120 comprises a processor 121 and a non-transitory computer-readable storage medium 122. Medium 122 comprises executable instructions for a mobile app 123. The executable instructions when executed by processor 121 from medium 122 cause processor 121 to perform operations discussed herein and below with respect to app 123.

Each retail server 130 comprises a processor 131 and a non-transitory computer-readable storage medium 132. Medium 132 comprises executable instructions for a transaction system 133. The executable instructions when executed by processor 131 from medium 132 cause processor 131 to perform operations discussed herein and below with respect to transaction system 133.

Retailers comprise product catalogues that provide data for items of the retailer, such as description, price, ingredients, nutritional information, quantity in stock, size, weight, etc. A variety of online services also provide recipes for various food dishes when provided certain selections and/or filters, such as food items available to a user or a desired type of dish that the user wants to prepare.

Initially, basic categories or classifications for food items are established, such as chicken, ground beef, onion, broccoli, etc. A recipe catalogue of a given recipe service has each recipe's item/ingredient recipe record labeled with its basic category. Note this can be also achieved via a table of the categories, each table entry comprising a unique category and a listing of item identifiers/ingredient (item codes) assigned the corresponding unique category, such that no changes to any given recipe service's recipes catalogue are needed with system 100.

Initial options displayed to the user when operating a splash or login screen of app are also predefined. Research has indicated that these initial options are optimally defined as 1) cost, 2) grade, 3) craving (cuisine type), 4) diet (restrictions), 5) servings desired, and 6) prep and cook time desired. The cost is a dollar value that the customer is willing to spend for a food dish. The grade relates to the quality of the food items for the food dish such as organic, premium, store brand, low cost and quality brand. The craving refers to the type of cuisine that the user is interest in, such as American, Italian, Chinese, Mexican, Indian, comfort, pizza, etc. The diet restrictions refer to those things that the user wants to avoid or wants to include based on their diet preferences, such as no salt, no sugar, vegetarian, vegan, Paleo®, Keto®, gluten free, etc. The servings desired is the number of individuals that the user expects the dish to feed once prepared. The prep and cook time refers to an optimal amount of time that the user expects to expend in preparing and cooking the food dish.

The user enters values of predefined selections for each of the six initial options within the customer-facing interface of app 123. App 123 sends the values and selections for the initial options to list/feedback manager 115.

In an embodiment, list/feedback manager 115 searches known recipes from a recipe service restricted to or filtered on the user's values and selections and returns a list of potential food dishes that satisfies the users food dish criteria.

In an embodiment, recipe manager 114 maintains the recipes on behalf of list/feedback manager 115 or maintains a table mapping of categories for ingredients associated with a third-party recipe service.

So, the recipes may be maintained on cloud/server 110 through recipe manager 114; maintained externally on recipe services' servers, which recipe manager 114 or list/feedback manager 115 interacts with and maintains a table mapping of ingredient categories.

The list of potential food dishes are provided back to app 123 for presentation and selection by the user of a specific food dish. When the user selects a desired food dish from the list of potential food dishes within the customer-facing interface of app 123, the labels associated with each ingredient or item in the recipe of the chosen food dish are obtained along with the amount required (quantity or weight) from the recipe of each ingredient (such as 1 chicken breast, two teaspoons of salt, etc.).

In an embodiment, the customer-facing interface of app 123 may present an option for the user to enter a store where the user would like to obtain the ingredients for the food dish. The customer-facing interface of app 123 may allow a listing of stores to be presented for selection based on registered preferences of the user and/or based on a current location reported by device 120 using location services and a configured distance from the current location, any store known to have the ingredients needed within the configured distance are presented for selection by the user.

Once the user selects a store for picking up the ingredients of the recipe for their food dish, app 123 reports the store identifier to list/feedback manager 115. List/Feedback manager 115 maps the store identifier to a given retailer associated with retailer server 130. Using an Application Programming Interface (API), list/feedback manager 115 interacts with transaction system 133 and searches the retail store's product catalogue for the tags placed on the ingredients of the recipe for the user-selected food dish. The results are returned in item records, each item record comprising an item code, an item price, an item weight, an item serving size, an item description, and an aisle and shelf or a display location where the item is stocked in the store. Using the API, list/feedback manager 115 may also obtain a planogram from transaction system 133 for the store. The planogram shows the aisles, shelves, displays and overall layout of the store.

List/Feedback manager 115 then generates a shopping list for the store for the user to obtain the ingredients of the chosen food dish. The shopping list is sent to app 123 for displaying to the user within the customer-facing interface of app 123.

In an embodiment, list/feedback manager 115 organizes the shopping list based on an order in which the customer will pick the ingredients from the store using the planogram and the locations of each of the ingredients in the list.

In an embodiment, list/feedback manager 115 provides with the list a clickable route from the customer-facing interface of app 123 that when activated by the user displays graphically and/or provides text instructions how the user is traverse and navigate the store to pick each ingredient from the list over an optimal picking route.

In an embodiment, list/feedback manager 115 displays the item/ingredient prices obtained from transaction system 133 with the ingredient shopping list along with a total price for the ingredients on the list.

In an embodiment, list/feedback manager 115 obtains any customer-available coupons available from the store or a manufacturer for each ingredient and provides a link next to each ingredient in the list, which when activated by the user within app 123 presents the coupon code for redemption by the user when checking out of the store.

In an embodiment, the grade or food grade initial options are determined based on price ranges known for the items/ ingredients, such as a high predefined range, a medium predefined range, and a low predefined range.

In an embodiment, the transaction system 133 further provides access to each store's current inventory of items, such that list/feedback manager 115 can determine when a given store is out of a needed ingredient for a user chosen food dish and alert the user through app 123 to select a different store because of the missing ingredient at the user's selected store.

In an embodiment, app 123 provides an option for the user to order the ingredients of the list through list/feedback manager 115 for pickup or delivery to the user. In this embodiment, list/feedback manager 115 uses an order API to interact with an order system of the store to place the order for customer pickup or delivery to a customer-provided address.

In an embodiment, cloud/server 110 is provided as a monthly service to users, where users are permitted to select 1-N food dishes per month, the recipes and the ingredients in the list for each recipe are ordered and delivered monthly to the customer.

In an embodiment, as system 100 processes overtime and food dishes with their recipes and ingredient lists are provided to users, a trained machine-learning model (MLM) is trained based on feedback and surveys pushed through app 123 by list/feedback manager 115 to the users. The feedback allows the user to rate the initial factors selected to see if the user was satisfied with the quality, the cost, the cuisine (craving), the dietary restrictions, serving sizes, and prep and cook time required. The user can also rank the food dish overall along a scale (such as 1 to 5). This feedback is used to train MLM 113 to rank food dishes for a particular user or a group of users as a whole. When list/feedback manager 115 finds potential food dishes that meet the user provided values and selections for the initial options, list/feedback manager 115 provides the potential food choices to MLM 113 along with the user's choices and the output of MLM 131 is a ranked order listing of the potential food choices, the ranked order is then sent to app 123 for displaying to the user in the ranked order via the customer interface of app 123. Moreover, a list of priorities or preferences may be maintained for each user that allows the user to rank in the user's priority order the importance of the 6 options, these priorities may be supplied to the MLM 113 with the potential food dishes, such that the user's priorities are reflected in the user's ranked order.

In an embodiment, app 123 is an existing shopping app of a third-party provider or of a specific retailer, which is enhanced through API to interact with list/feedback manager 115 in the manners discussed above.

In an embodiment, app 123 allows the user to add an ingredient list for a specific user-selected food dish into an existing weekly shopping list maintained by the user for weekly shopping trips. In this case, the generated navigation route through the store to pick the items from the combined list is modified to account for the weekly shopping list items.

In an embodiment, model 113, recipe manager 114, and list/feedback manager 115 are subsumed into and processed on a specific retail server 130 rather than through cloud/server 110.

The above-referenced embodiments and other embodiments are now discussed with reference to FIGS. 2-3.

Figure 2:
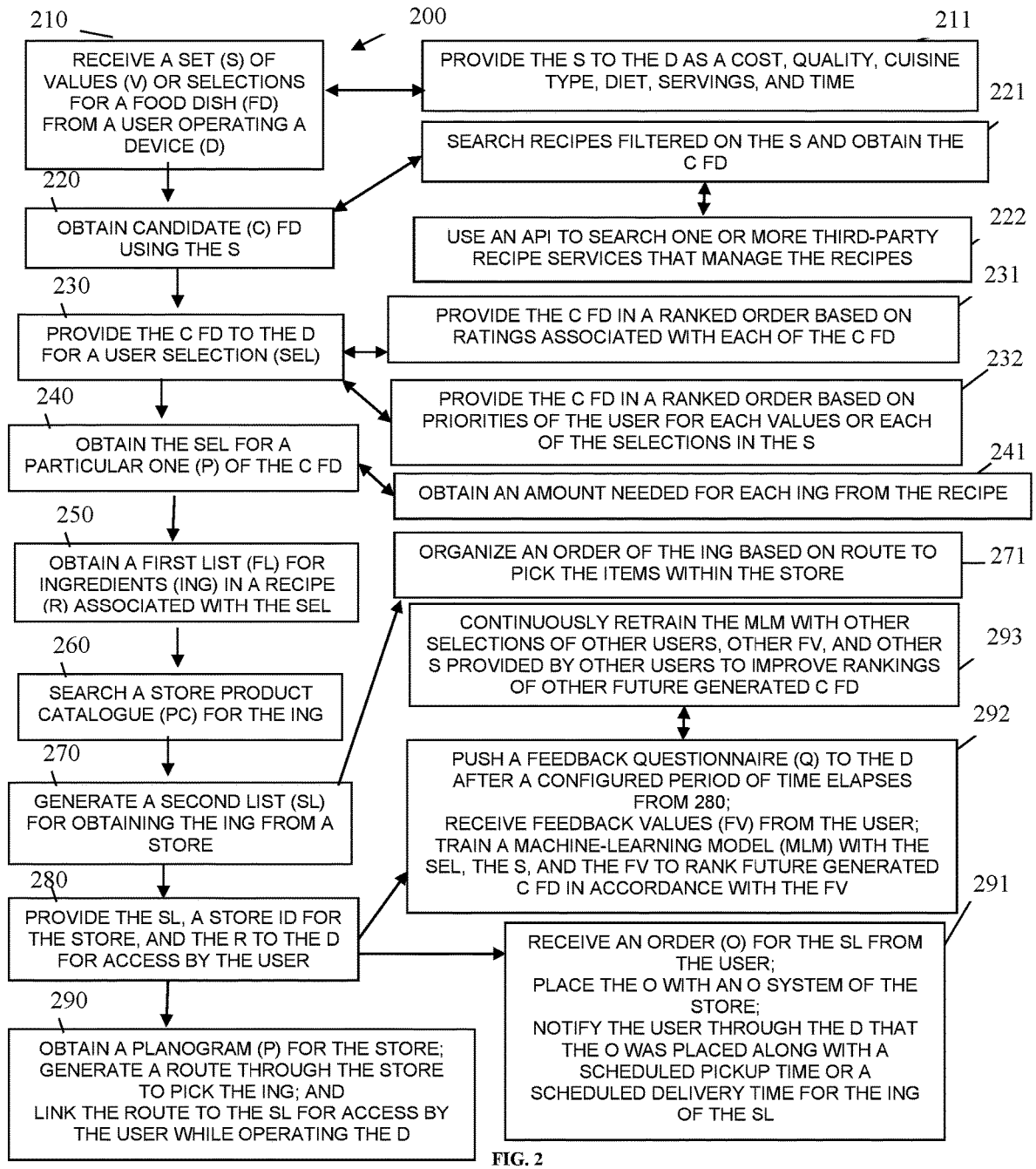
FIG. 2 is a diagram of a method for providing a recipe-based shopping list service, according to an example embodiment.

FIG. 2 is a diagram of a method 200 for providing a recipe-based shopping list service, according to an example embodiment. The software module(s) that implements the method 200 is referred to as a "recipe-based shopping list service." The recipe-based shopping list service is implemented as executable instructions programmed and residing within memory and/or a non-transitory computer-readable (processor-readable) storage medium and executed by one or more processors of one or more devices. The processor(s) of the device(s) that executes the recipe-based shopping list service are specifically configured and programmed to process the recipe-based shopping list service. The recipe-based shopping list service has access to one or more network connections during its processing. The connections can be wired, wireless, or a combination of wired and wireless.

In an embodiment, the device that executes the recipe-based shopping list service is cloud 110. In an embodiment, the device that executes recipe-based shopping list service is server 110.

In an embodiment, the device that executes the recipe-based shopping list service is retail server 130.

In an embodiment, the device that executes the recipe-based shopping list service is a server associated with a third-party shopping service.

In an embodiment, the recipe-based shopping list service is all of, or some combination of model(s) 113, recipe manager 114, and/or list/feedback manager 115.

At 210, recipe-based shopping list service receives a set of values or selections for a food dish from a user operating a device 120.

In an embodiment, at 211, the recipe-based shopping list service provides the set of values or selections to the device for user selection as a cost selection, a quality of food item selection, a cuisine type selection, a dietary restriction selection, a number of servings desired selection, and a preparation and cook time selection.

At 220, the recipe-based shopping list service obtains candidate food dishes using the set of values or selections.

In an embodiment, at 221, the recipe-based shopping list service searches recipes filtered on the set of values or selections and obtains the candidate food dishes as results of the search.

In an embodiment of 221 and at 222, the recipe-based shopping list service uses an API to search one or more third-party recipe services that manage recipes.

At 230, the recipe-based shopping list service provides the candidate food dishes to the device 120 for user selection of one of the candidate food dishes.

In an embodiment, at 231, the recipe-based shopping list service provides the candidate food dishes in a ranked order based on ratings associated with each of the candidate food dishes.

In an embodiment, at 232, the recipe-based shopping list service provides the candidate food dishes in a ranked order based on priorities of the user for each of the values or each of the selections in the set of values or selections.

At 240, the recipe-based shopping list service obtains the user selection for a particular one of the candidate food dishes.

In an embodiment, at 241, the recipe-based shopping list service obtains an amount needed for each ingredient from the recipe associated with the selected food dish.

At 250, the recipe-based shopping list service obtains a first list for ingredients in the recipe associated with the user selected food dish.

At 260, the recipe-based shopping list service searches a store product catalogue for the ingredients.

At 270, the recipe-based shopping list service generates a second list for obtaining the ingredients from a store associated with the product catalogue.

In an embodiment, at 271, the recipe-based shopping list service organizes an order of the ingredients within the second list based on a route to pick the items within the store.

At 280, the recipe-based shopping list service provides the second list, a store identifier for the store, and the recipe to the device 120 for access and viewing by the user.

In an embodiment, at 290, the recipe-based shopping list service obtains a planogram from the store and generates a route through the store for picking the ingredients from shelves and displays of the store. The recipe-based shopping list service links the route to the second list for access by the user while operating the device 120.

In an embodiment, at 291, the recipe-based shopping list service receives an order for the select list from the user operating device 120. The recipe-based shopping list service places the order with an order system of the store and notifies the user through the device 120 that the order was placed along with a scheduled pickup time or a scheduled delivery time for the ingredients of the second list.

In an embodiment, at 292, the recipe-based shopping list service pushes a feedback questionnaire to the device 20 after a configured period of time elapses from 280 (when the second list was provided to the user). The recipe-based shopping list service receives feedback values from the user operating device 120. The recipe-based shopping list service trains a MLM 113 with the set of values or selections, the user selected food dish, and the feedback values for the MLM 113 to rank future generated candidate food dishes in accordance with the feedback values.

In an embodiment of 292 and at 293, the recipe-based shopping list service continuously trains the MLM 113 with other food selections, of other users, other feedback values provided by the other users, and other sets of values or selections provided by the other users to improve rankings of other future generated candidate food dishes.

Figure 3:
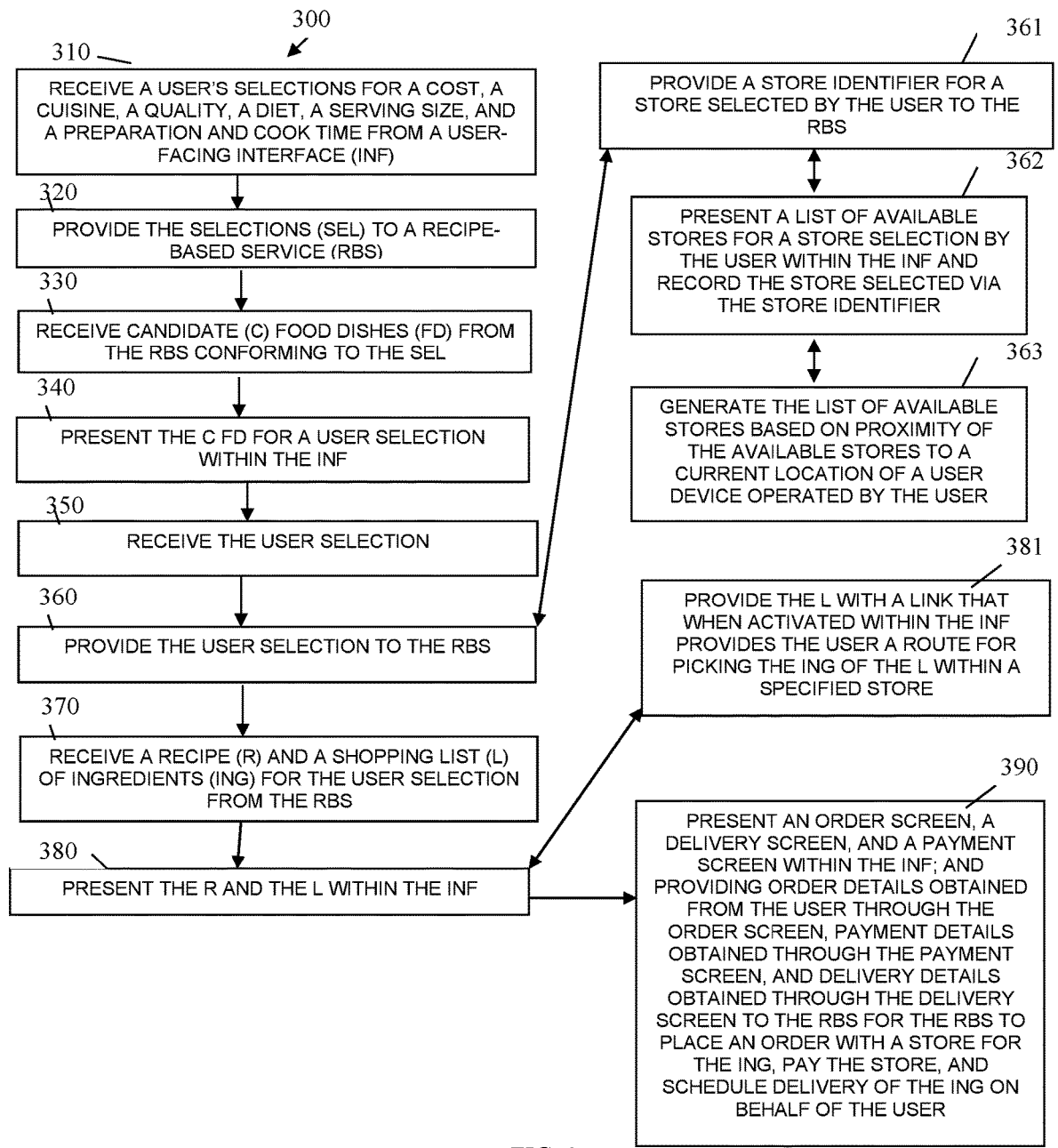
FIG. 3 is a diagram of another method for providing a recipe-based shopping list service, according to an example embodiment.

FIG. 3 is a diagram of another method 300 for providing a recipe-based shopping list service, according to an example embodiment. The software module(s) that implements the method 300 is referred to as a "recipe-based list app." The recipe-based list app is implemented as executable instructions programmed and residing within memory and/or a non-transitory computer-readable (processor-readable) storage medium and executed by one or more processors of one or more devices. The processor(s) of the device(s) that executes the recipe-based list app are specifically configured and programmed to process the recipe-based list app. The recipe-based list app has access to one or more network connections during its processing. The network connections can be wired, wireless, or a combination of wired and wireless.

In an embodiment, the device that executes the recipe-based list app is user-operated device 120. In an embodiment, the device 120 is a phone, a laptop, a watch, a tablet, or glasses.

In an embodiment, the recipe-based list app is app 123.

The recipe-based list app interacts with list/feedback manager 115 and/or method 200.

At 310, the recipe-based list app receives a user's selection for a cost, a cuisine, a quality, a diet, a serving size, and a preparation and cook time from a user-facing interface of recipe-based list app.

At 320, the recipe-based list app provides the selections to a recipe-based service 115 (or method 200).

At 330, the recipe-based list app receives candidate food dishes from the recipe-based service 115 (or method 200) that conforms to the selections.

At 340, the recipe-based list app presents the candidate food dishes for user selection within the user-facing interface of the recipe-based list app to the user.

At 350, the recipe-based list app receives the user selection from the user-facing interface.

At 360, the recipe-based list app provides the user selection to the recipe-based service 115 (or method 200).

In an embodiment, at 361, the recipe-based list app provides a store identifier for a store selected by the user through the user-facing interface to the recipe-based service 115 (or method 200).

In an embodiment of 361 and at 362, the recipe-based list app presents a list of available stores for a store selection by the user within the user-facing interface and records the store selected via the store identifier.

In an embodiment of 362 and at 363, the recipe-based list app generates the list of available stores based on proximities of the available stores to a current location of a user device 120 operated by the user. User device 120 also processes recipe-based list app.

At 370, the recipe-based list app receives a recipe for the selected food dish and a shopping list of ingredients for the user selected food dish from the recipe-based service 115 (or method 200).

At 380, the recipe-based list app presents the recipe and the shopping list within the user-facing interface of the recipe-based list app.

In an embodiment, at 381, the recipe-based list app provides the shopping list with a link that when activated within the user-facing interface by the user provides the user a route for picking the ingredients of the shopping list within the specified store.

In an embodiment, at 390, the recipe-based list app presents an order screen, a delivery screen, and a payment screen within the user facing interface. The recipe-based list app provides order details obtained from the user through the order screen, payment details obtained through the payment screen from the user, and delivery details obtained through the delivery screen from the user to the recipe-based service 115 (or method 200) for the recipe-based service 115 (or method 200) to place an order with the store and schedule a delivery of the ingredients associated with the shopping list to and on behalf of the user.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A method, comprising:
   receiving, by a processor of a server, a set of values or selections for a food dish from a user operating a device based on options presented to the user in a user interface of a mobile application, wherein the options comprise a cost selection, a quality selection, a cuisine type selection, a diet restriction selection, a number of servings selection, a preparation and cook time selection;
   obtaining, by the processor, candidate food dishes using the set of values or selections;

providing, by the processor, the candidate food dishes to the user interface of the mobile application for a user selection;

obtaining, by the processor, the user selection for a particular one of the candidate food dishes;

obtaining, by the processor, a first list for ingredients in a recipe associated with the user selection using a table that links the recipe to the ingredients;

searching, by the processor, a store product catalogue for the ingredients using a store application programming interface (API);

generating, by the processor, a second list for obtaining the ingredients from a store using a planogram of the store and inventory data for the store;

providing, by the processor, the second list, a store identifier for the store, and the recipe to the user interface of the mobile application for viewing by the user;

obtaining, by the processor, the planogram for the store;

generating, by the processor, a route through the store to pick the ingredients;

linking, by the processor, the route to the second list for access by the user while operating the device;

providing, by the processor, a clickable route option within the user interface; and in response to the user selecting the clickable route option, displaying graphically the route for the user to obtain the second list from the store and providing text instructions for the user to traverse and navigate the store to pick each ingredient from the second list.

2. The method of claim 1 further comprising:

receiving, by the processor, an order for the second list from the user;

placing, by the processor, the order with an order system of the store; and notifying, by the processor, the user through the user interface of the mobile application that the order was placed along with a scheduled pickup time or a scheduled delivery time for the ingredients of the second list.

3. The method of claim 1 further comprising:

pushing a feedback questionnaire to the device after a configured period of time that elapses from the providing of the second list;

receiving feedback values from the user; and training a machine-learning model with the user selection of the particular food dish, the set of values or selections, and the feedback values to rank future generated candidate food dishes in accordance with the feedback values of the user.

4. The method of claim 3, wherein the training further includes continuously training the machine-learning model with selections of other users, other feedback values of the other users, and other sets of values or selections provided by the other users to improve rankings of other further generated candidate food dishes.

5. The method of claim 1, wherein the obtaining the candidate food dishes further includes searching recipes filtered on the set of values of selections and obtaining the candidate food dishes.

6. The method of claim 5, wherein the searching the recipes further includes using an Application Programming Interface (API) to search one or more third-party recipe services that manage the recipes.

7. The method of claim 1, wherein the providing the candidate food dishes further includes providing the candidate food dishes in a ranked order based on ratings associated with each of the candidate food dishes.

8. The method of claim 1, wherein the providing the candidate food dishes further includes providing the candidate food dishes in a ranked order based on priorities of the user for each of the values or each of the selections in the set of values or selections.

9. The method of claim 1, wherein the obtaining the first list further includes obtaining an amount needed for each ingredient from the recipe.

10. The method of claim 1, wherein the generating further includes organizing an order of the ingredients within the second list based on the route through the store to pick each of the ingredients.

11. A system, comprising:

a server comprising a processor and a non-transitory computer-readable storage medium;

the non-transitory computer-readable storage medium comprises executable instructions; and the executable instructions when executed by the processor from the non-transitory computer-readable storage medium cause the processor to perform operations, comprising:

obtaining options from a user through a user interface of an application processed on a user-operated device based on options presented to the user in the user interface, wherein the options comprise a cost selection, a quality selection, a cuisine type selection, a diet restriction selection, a number of servings selection, a preparation and cook time selection;

identifying candidate food dishes that conform to selections or values provided by the user through the application in response to the options presented in the user interface;

instructing the application to present the candidate food dishes to the user for a food selection within the user interface;

receiving the food selection for one of the candidate food dishes from the user;

obtaining a recipe for the food selection, the recipe comprises ingredients and other instructions for preparation of the food selection using a table that links the recipe to the ingredients;

identifying a store for obtaining the ingredients by searching for the ingredients in product catalogues of stores using store application programming interfaces;

generating a shopping list for the ingredients at the store using a planogram and inventory data associated with the store and obtained via a store-specific application programming interface;

instructing the application to present the recipe and the shopping list to the user within the user interface;

generating a route through the store using the planogram for the user to pick the ingredients;

making the route accessible through a link associated with the shopping list when activated by the user through the application; and providing a clickable route option within the user interface;

in response to the user selecting the clickable route option, displaying graphically the route for the user to obtain the second list from the store and providing text instructions for the user to traverse and navigate the store to pick each ingredient from the second list.

\* \* \* \* \*